No. 859,115. PATENTED JULY 2, 1907.
G. N. SAEGMULLER.
ILLUMINATING ATTACHMENT FOR SIGHTS FOR ORDNANCE.
APPLICATION FILED APR. 9, 1907.
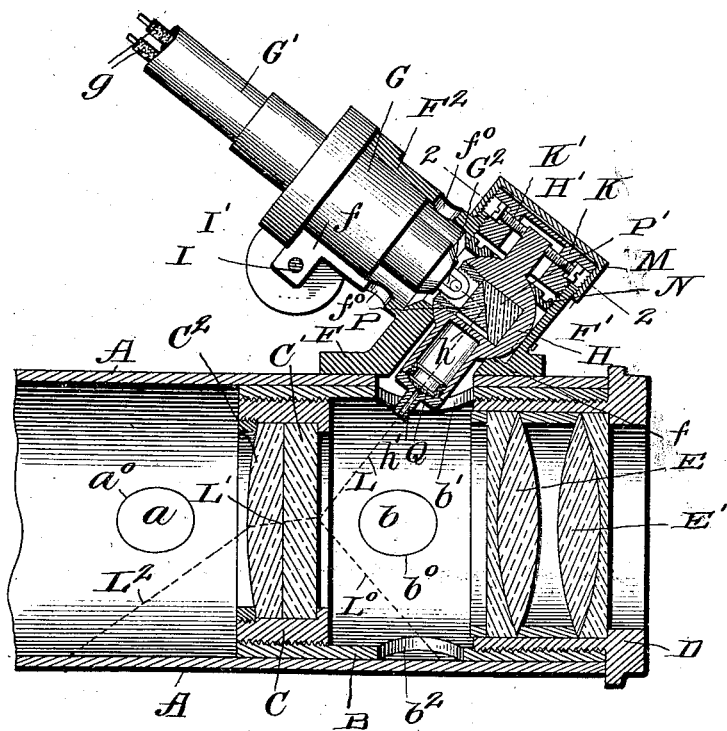
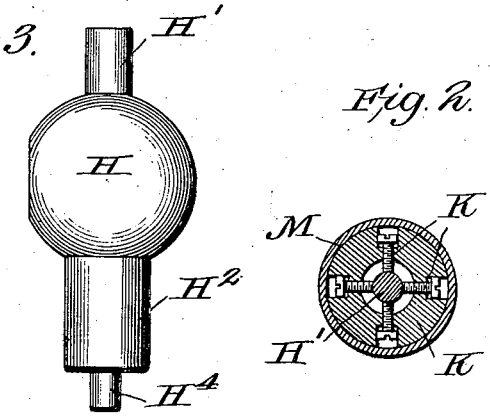
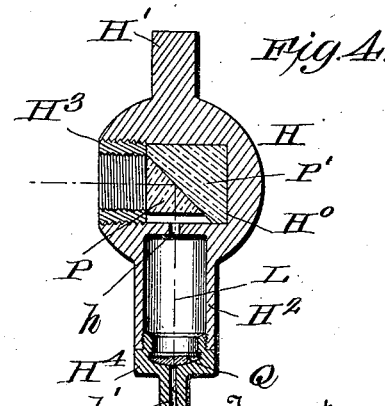
Witnesses
Inventor,
George N. Saegmuller,
by Wilkinson & Fisher,
Attorneys.

UNITED STATES PATENT OFFICE.

GEORGE NICHOLAS SAEGMULLER, OF ROCHESTER, NEW YORK.

ILLUMINATING ATTACHMENT FOR SIGHTS FOR ORDNANCE.

No. 859,115.  Specification of Letters Patent.  Patented July 2, 1907.

Application filed April 9, 1907. Serial No. 367,287.

*To all whom it may concern:*

Be it known that I, GEORGE NICHOLAS SAEGMULLER, a citizen of the United States, residing at Rochester, in the county of Monroe and State of New York, have invented certain new and useful Improvements in Illuminating Attachments for Sights for Ordnance; and I do hereby declare the following to be a full, clear, and exact description of the invention, such as will enable others skilled in the art to which it appertains to make and use the same.

This invention consists in an illuminating attachment intended to be used at night with gun sight telescopes of that class which have reticules composed of glass or other refracting material with cross lines etched therein, or which have simple cross hairs or wires, used in the ordinary way.

The purpose of the invention is to illuminate a portion of the cross lines drawn or etched on the surface of glass in a compound cemented lens of a sight telescope, or to illuminate the wires or cross hairs themselves.

The invention hereinafter described is intended to provide certain improvements over that shown in the application of Henry C. Mustin and George N. Saegmuller, improvements in sights for ordnance, filed April 17, 1906, Serial No. 312,212.

The object of the invention can be explained by pointing out the defects in other devices for illumination. For example, there is one which consists in placing in the eye piece of a telescope a glass reticule with parallel plane faces; on one of these faces cross lines are etched. The periphery of the reticule is polished and silvered except for a small portion where a pencil of light is admitted to the interior; the rays of light entering the interior illuminate a portion of the cross lines directly and illuminate the other portions indirectly after successive reflections at the cylindrical mirror formed by the periphery of the reticule. The complete cross lines are thus rendered visible; but besides the light scattered from the cross lines there is light from the caustics which are necessarily formed within the field, by reflection at the cylindrical surface of the periphery of the reticule; also there is light scattered from dust, or any inequalities on the faces of the reticule. All of this light is additional to the light emitted by the target or other object under observation; now it is well known that when an observer is looking at a dim object, all luminous surfaces between the object under observation and his eye are serious hindrances to his ability to see the object. But, in order that the line of sight may be directed to the target, the observer must be able to see the intersection of the cross lines, so there must be at least a sufficient amount of light for that purpose interposed between his eye and the target. In the case cited, there is added to this amount, a comparatively large quantity which is certain to be given by the caustics. The same defect appears in another type of illuminating device in which, instead of a reticule, there is a compound cemented lens, on one of whose cemented faces are etched the cross lines. The periphery of this compound lens is polished and silvered except for a small portion where the pencil of light is admitted to illuminate the cross lines; the caustics by reflection at a cylindrical surface are therefore formed within the field of this telescope also, and thus the observer's ability to direct the line of sight to a dim target is seriously hindered. It is evident that the efficiency of a night sight telescope will be a maximum when the intensity of light from luminous surfaces interposed between the eye and the object under observation is reduced to a minimum. To this end it is necessary to remove the caustics and to restrict the illuminated area of the line to only that portion of them that is required for directing the line of sight. Now in order that the line of sight may be directed, it is necessary, as stated above, for the observer to distinguish the intersection of the cross lines; the vicinity of the intersection must therefore be given a certain intensity of illumination per unit of area. Heretofore it has been the practice to give the cross lines or, in other types, to the cross wires or hairs a uniform illumination over all parts of them that appear in the field. Now if the illumination per unit of area is kept constant, and the area illuminated be restricted to the vicinity of the intersection, the ability of the observer to direct the line of sight will not be interfered with, but the total quantity of light sent from the lines to the observer's eye will be diminished.

The object of the invention, therefore, is to illuminate a very small portion of the intersection of the cross lines, without producing in the field of the telescope any caustics or luminous areas that would be a hindrance to the ability of an observer to distinguish a dim target or other object; the area illuminated in the vicinity of the intersection of the lines is made so small that, although the intersection is distinct, the hindrance from this interposed luminous area is negligible.

I will now describe the means of accomplishing this in the case of a sight telescope in which there are etched cross lines on one of the cemented faces of a compound field lens. A small pencil of approximately parallel rays of light from the rear, is thrown on the rear face of the field lens at such an angle that the axis of the pencil, after refraction at this face, makes as small an angle with the axis of the eye piece as is practicable. The direction of the pencil, inside the field lens, is such that its path crosses and thus illuminates the intersection of the cross lines. The pencil after emergence from the front face of the field lens proceeds to a portion of the telescope tube that is obscured from the eye of the observer. There is of course a partial reflection at the rear face of the field lens where the pencil enters; but these partially reflected rays proceed to a recess in the tube which is obscured from the eye of the observer. The partial reflection at the front face of the field lens when the pencil emerges, is negligible for the incident light is very nearly normal to the surface at this point. In consequence of this arrangement only a small amount of light is thrown on the intersecting lines, and this light is sufficient only for the purpose of illuminating the vicinity of the intersection of those lines, and it does not subsequently appreciably affect the clearness of the object.

This invention will be understood by reference to the accompanying drawings in which the same parts are indicated by the same letters throughout the several views.

Figure 1 shows a central vertical section through the eye piece end of the sight telescope, and shows the illuminating attachment, partly in section and partly in elevation. Fig. 2 shows a cross section along the line 2—2 of Fig. 1. Fig. 3 is a detail showing the exterior of the adjustable prism holder, and Fig. 4 shows a section through the axis of the prism holder shown in Fig. 4.

In the drawings the eye piece end of the telescope only is shown, as the other parts of the telescope are well known in the art and do not constitute a part of this invention.

A represents the main telescope tube in which is mounted the sleeve B, which carries the compound field lens which is composed of the plane glass plate $C'$ cemented to the lens $C^2$. Etched on the face of this plate $C'$ or on the face of the lens $C^2$, where the two faces abut, are the ordinary intersecting lines, which correspond to cross hairs. These lines are well known and are not shown in the drawings.

To keep the outer surface of the plate and lens free from dust, openings $a^0$ and $b^0$ are provided, which are closed by suitable shutters $a$ and $b$. These shutters may be removed and the face of the lens or plate may be brushed off with a suitable brush inserted through the opening; thus, whenever necessary, the field lens may be cleaned without disturbing the optical adjustment of the telescope, and without disturbing the relation between the axis of the bore of the gun and the line of sight.

The compound lenses E and E' which compose the eye lens combination are mounted in the ring D, which is screwed into the sleeve B.

So far as described, the optical parts are all old, and the invention consists in applying to these old parts the improved illuminating device which will now be described.

F represents a socket piece, which is attached to the telescope tube A over the opening $b'$ in the sleeve B. This socket piece has two hollow arms F' and $F^2$, fixed at right angles to each other, which form holders for the adjustable prism holder H, and for the lamp socket G, which is connected by the wires $g$ in the cable G' to the source of electricity, not shown. This lamp socket G carries a small incandescent lamp $G^2$. This holder $F^2$ is provided with lugs $f$ to engage the clamp screw I, which is operated by the milled head I', and thus the socket G is adjustably clamped in its holder. Suitable ventilating holes $f^0$ are provided to prevent excessive heating, while the current is on the lamp. The lamp socket may be moved in or out and clamped at the desired position in the holder $F^2$, whereby the amount of light thrown on the cross lines may be varied, as desired.

H represents the prism holder, which consists of a substantially spherical body portion hollowed out, as at $H^0$, see Fig. 4, and with a cylindrical projecting arm H' at one side of the body portion, and with a hollow projecting arm $H^2$ at the other side. This latter arm is closed by a screw cap $H^4$ having the axial perforation $h'$ in line with the perforation $h$ at one side of the prism chamber. The prism P and its metal support P' are held in place in the prism chamber $H^0$ by means of the screw cap $H^3$. The spherical portion of the prism holder H is seated, as at $f$, in the socket piece F, and is also seated on a suitable bearing in the annular screw cap N, which is screwed into the arm F' of the socket piece. A second screw cap K is also screwed into this socket piece, carrying a series of screws K', which latter bear against the cylindrical arm H' of the prism holder H, and by means of these screws the axis of the prism holder may be adjusted with extreme accuracy.

One of the outer faces of the prism P is ground so as to give the effect of a ground source of light. Light from the lamp $G^2$ enters the prism P and is reflected, and the rays made parallel by means of the plano-convex lens Q, whose focal length equals the distance from the ground side of the prism to the plane side of lens, in the direction L, whence it is refracted in the direction L' by the compound lens, and emerges from said lens in the direction $L^2$, and strikes the side of the telescope out of the range of vision of the observer. That part of the light which is reflected from the face of the compound lens passes downward in the direction $L^0$ and enters the recess $b^2$, thus reaching the side of the telescope out of the range of vision of the observer.

It will be seen that only so much of the light from the lamp as can pass through the openings $h$ and $h'$, can enter the telescope, and that by adjusting the axis of the prism holder this pencil of rays may be caused to illuminate a limited portion only of the compound lens, and this light is then refracted in line substantially with the line of sight, thus not materially interfering with the vision of the observer. Thus a small part only of the field lens is illuminated, and by confining this part to the intersection of the cross hairs or lines, as already described, the illumination is so small as not to materially impair the ability of the observer to observe faint objects.

By grinding one face of the prism P, the light is softened and made more uniform, and the lamp socket may be moved in or out, thus varying the intensity of the illumination thrown on the field lens, but without making it material in what particular plane the filament of the lamp is located.

As these small lamps require frequent renewals, if the ground glass source of light were omitted, and the prism used in the ordinary transparent form, the intensity of the illumination thrown on the lens would not only vary with the distance of the lamp from the prism, but might also vary very materially, according to the exact position of the filament with regard to the axis of the illuminating attachment. By having the prism holder arranged with a ball and socket joint, as described, its axis may be very readily adjusted; and by the arrangement of prism and lens, etc., included entirely within this holder, any leakage of light into the telescope through the illuminating attachment, except that purposely transmitted through the openings $h$ and $h'$, is entirely avoided. Furthermore, this arrangement is very strong and durable, and is not apt to be put out of order by the sudden shocks to which apparatus of this character is necessarily subjected in ordinary usage.

While I have described the apparatus as used with cross lines etched into a compound lens, it will be obvious that the ordinary cross hairs or cross wires may be substituted for these lines without departing from the spirit of my invention. It will also be obvious that various other modifications might be made, which could be used without departing from the spirit of the invention.

Having thus described my invention, what I claim and desire to secure by Letters Patent of the United States, is:—

1. In an illuminating attachment for ordnance sights, the combination with a telescope having a reticule provided with cross lines, of an adjustable prism holder mounted on said telescope with its axis at an angle to the line of sight, and having an axial perforation therein, a source of light mounted at one side of said prism holder, and a prism mounted in said holder and adapted to reflect a pencil of rays of light from said source of light through said axial perforation, substantially as described.

2. In an illuminating attachment for ordnance sights, the combination with a telescope provided with a reticule having cross lines, of a socket piece secured to said telescope in rear of said reticule, and having two hollow arms at right angles to each other, an incandescent electric lamp mounted in one of said arms, a prism holder mounted in the other hollow arm and having an axial perforation opening into the interior of the telescope at an angle with the line of sight, and a right angle prism mounted in said prism holder and adapted to reflect a pencil of rays of light from said electric lamp through said axial perforation, substantially as described.

3. In an illuminating attachment for ordnance sights, the combination with a telescope provided with a reticule having cross lines, of a socket piece secured to said telescope in rear of said reticule, and having two hollow arms at right angles to each other, an incandescent electric lamp mounted in one of said arms, a prism holder mounted in the other hollow arm and having an axial perforation opening into the interior of the telescope at an angle with the line of sight, and a right angle prism, having one of its outer faces ground mounted in said prism holder and adapted to reflect a pencil of rays of light from said electric lamp through said axial perforation, and a lens mounted in said prism holder substantially as described.

4. In an illuminating attachment for ordnance sights, the combination with a telescope provided with a reticule having cross lines, of a socket piece secured to said telescope in rear of said reticule, and having two hollow arms at right angles to each other, an incandescent electric lamp mounted in one of said arms, a prism holder mounted in the other hollow arm and having an axial perforation opening into the interior of the telescope at an angle with the line of sight, with a right angle prism mounted in said prism holder and adapted to reflect a pencil of rays of light from said electric lamp through said axial perforation, and means for adjusting the axis of said prism holder, and a lens mounted in said prism holder substantially as described.

5. In an illuminating attachment for ordnance sights, the combination with a telescope provided with a reticule having cross lines, of a socket piece secured to said telescope in rear of said reticule, and having two hollow arms at right angles to each other, an incandescent electric lamp adjustably mounted in one of said arms, a prism holder mounted in the other hollow arm and having an axial perforation opening into the interior of the telescope at an angle with the line of sight, and a right angle prism mounted in said prism holder and adapted to reflect a pencil of rays of light from said electric lamp through said axial perforation, and a lens mounted in said prism holder substantially as described.

6. In an illuminating attachment for ordnance sights, the combination with a telescope having a reticule provided with cross lines, of an adjustable prism holder mounted on said telescope with its axis at an angle to the line of sight, and having an axial perforation therein, a source of light mounted at one side of said prism holder, and a prism having one of its faces ground mounted in said holder and adapted to reflect a pencil of rays of light from said source of light through said axial perforation, substantially as described.

7. In an illuminating attachment for ordnance sights, the combination with a telescope provided with a reticule having cross lines, of a socket piece secured to said telescope in rear of said reticule, and having two hollow arms at an angle to each other, an incandescent electric lamp mounted in one of said arms, a spherical prism holder provided with axially extending arms mounted in bearings in the other hollow arm and having an axial perforation in one of its arms opening into the interior of the telescope at an angle with the line of sight, adjusting screws engaging one of the arms of said prism holder, and a prism mounted in said prism holder and adapted to reflect a pencil of rays of light from said electric lamp through said axial perforation, substantially as described.

8. In an illuminating attachment for ordnance sights, the combination with a telescope provided with a reticule having a compound lens with cross lines etched therein, of a socket piece secured to said telescope in rear of said reticule, and having two hollow arms at an angle to each other, an incandescent electric lamp mounted in one of said arms, a prism holder mounted in the other hollow arm and having a perforation opening into the interior of the telescope at an angle with the line of sight, with a prism, having one of its outer faces ground, mounted in said prism holder and adapted to reflect a pencil of rays of light from said electric lamp through said axial perforation, substantially as described.

9. In an illuminating attachment for ordnance sights, the combination with a telescope provided with a reticule having a compound lens with cross lines etched therein, of a socket piece secured to said telescope in rear of said reticule, and having two hollow arms at an angle to each other, an incandescent electric lamp mounted in one of said arms, a prism holder mounted in the other hollow arm and having a perforation opening into the interior of the telescope at an angle with the line of sight, with a prism mounted in said prism holder and adapted to reflect a pencil of rays of light from said electric lamp through said perforation, and means for adjusting the axis of said prism holder, and a lens mounted in said prism holder substantially as described.

In testimony whereof, I affix my signature, in presence of two witnesses.

GEORGE NICHOLAS SAEGMULLER.

Witnesses:
 FRED W. BETTIN,
 GEORGE H. LEFFLER.